(12) United States Patent
Dobschal et al.

(10) Patent No.: US 8,405,904 B2
(45) Date of Patent: Mar. 26, 2013

(54) DEVICE FOR SUPERIMPOSING AN IMAGE INTO THE BEAM PATH OF AN AIMING OPTIC

(75) Inventors: Hans-Juergen Dobschal, Kleinromstedt (DE); Guenter Rudolph, Jena (DE); Eva-Maria Menzel, Jena (JP); Christian Sinn, Giessen (DE); Karsten Lindig, Erfurt (DE); Thomas Wagner, Wettenberg (DE)

(73) Assignees: Carl Zeiss Sports Optics GmbH, Wetzlar (DE); Carl Zeiss AG, Oberkochen (DE)

( * ) Notice: Subject to any disclaimer, the term of this patent is extended or adjusted under 35 U.S.C. 154(b) by 617 days.

(21) Appl. No.: 12/629,117

(22) Filed: Dec. 2, 2009

(65) Prior Publication Data

US 2010/0208341 A1    Aug. 19, 2010

(30) Foreign Application Priority Data

Dec. 2, 2008   (DE) .......................... 10 2008 059 892

(51) Int. Cl.
*G02B 23/00*    (2006.01)

(52) U.S. Cl. ............ 359/399; 359/15; 359/428; 42/123; 42/131; 356/247

(58) Field of Classification Search ................... 359/15, 359/399, 428; 42/122, 123, 130, 131, 132; 356/247
See application file for complete search history.

(56) References Cited

U.S. PATENT DOCUMENTS

| | | | |
|---|---|---|---|
| 4,218,111 A * | 8/1980 | Withrington et al. | 359/13 |
| 4,248,496 A | 2/1981 | Akin, Jr. et al. | |
| 5,483,362 A * | 1/1996 | Tai et al. | 359/1 |
| 5,835,263 A | 11/1998 | Dobschal | |
| 6,975,457 B1 * | 12/2005 | Greenaway et al. | 359/565 |
| 7,145,703 B2 * | 12/2006 | Sieczka et al. | 359/15 |
| 2006/0092507 A1 | 5/2006 | Menges et al. | |
| 2006/0164704 A1 * | 7/2006 | Sieczka et al. | 359/15 |
| 2012/0137567 A1 * | 6/2012 | Sammut | 42/130 |

FOREIGN PATENT DOCUMENTS

| | | |
|---|---|---|
| DE | 19525520 C2 | 1/1997 |
| DE | 102007021036 A1 | 11/2008 |
| EP | 0866163 A1 | 9/1998 |
| EP | 1653271 A1 | 5/2006 |
| GB | 2077936 A | 12/1981 |
| GB | 2458865 A | 11/2008 |
| WO | 2006/064301 A1 | 6/2006 |
| WO | 2007/029032 A1 | 3/2007 |

* cited by examiner

*Primary Examiner* — Frank Font
(74) *Attorney, Agent, or Firm* — GrayRobinson, P.A.

(57) ABSTRACT

The invention relates to a device for superimposing an image in the beam path of an aiming optics, having an at least partially transparent optical support element which is arranged in the beam path of the aiming optics and has at least one diffractive optical coupling element and at least one diffractive optical decoupling element, the at least one diffractive optical coupling element leading light of the image to be superimposed, which light is incident on said coupling element and is to be coupled in, through the optical support element to the at least one diffractive optical decoupling element for the purpose of superimposition with the beam path. The image to be superimposed is imaged into the beam path of the aiming optics by the at least one diffractive optical coupling element and the least one diffractive optical decoupling element.

19 Claims, 5 Drawing Sheets

DEVICE FOR SUPERIMPOSING AN IMAGE INTO THE BEAM PATH OF AN AIMING OPTIC

CROSS REFERENCE TO RELATED APPLICATIONS

This application claims priority under 35 U.S.C. §119(a)-(d), and claims priority to German Application No. 10 2008 059 892.5, filed Dec. 2, 2008, which is hereby incorporated by reference in its entirety to form part of this application.

FIELD OF THE INVENTION

The invention relates to a device for superimposing an image in the beam path of an aiming optic and to an aiming optics having an objective to be turned in the operating position to a target object to be observed, an eyepiece to be turned to an eye of the observer, and a beam path.

Future aiming optics and/or telescopic sights are to be equipped with ballistic systems. It is therefore desirable to have a flexible target mark or a flexible target point in the surveillance unit of the telescopic sight. Furthermore, it should also be possible to display other information in the telescopic sight. Different concepts for superimposing or reflecting in such flexible target marks are known from practice. Such optical methods for input reflection should substantially fulfill the following boundary conditions. The transmittance for the main light or the observation light of the telescopic sight or the aiming optics should be as high as possible (for example greater than 95%). The diffraction efficiency of the input reflection module should be greater than 1%. Moreover, the physical space for an appropriate input reflection module should be adapted to the physical space of the telescopic sight.

In addition, there can be a need to magnify the target mark with the zoom of the telescopic sight so that the extent of cover during zooming is maintained and that it is possible for the gunner to estimate range conveniently.

EP 0 886 163 B1 discloses a reticle and an optical device having an illuminated reticle. The reticle consists of a substrate and a mark which is applied to a surface of the substrate and emits light in a fashion substantially perpendicular to the surface at a laterally arranged light source, the mark being designed as a diffracting grating. The mark can have an amplitude rating with transparent gaps and opaque bars which consist of chromium. It could be disadvantageous in this case that a relatively complex mark grating would need to be provided to display a plurality of target points, and that the positional tolerances of the target points would have a very strong effect on the grating tolerances.

EP 1 653 271 A1 relates to an illuminable reticle which has a mirror which is arranged laterally next to the substrate and has two focal points. The light source is arranged at one focal point. The reticle image is arranged at the second focal point, total internal reflection also being possible, if appropriate, at one of the two substrate surfaces in order to focus the light beams in the reticle image.

DE 195 25 520 C2 describes how images are coupled into beam paths of microscopes by means of diffracting optical elements, in particular reflection and transmission gratings. The diffractive optical elements described there have no imaging effect. The imaging effect is attained by further optical elements.

Reference is further made to WO 00/16150 for the further prior art.

SUMMARY OF THE INVENTION

Starting herefrom, it is the object of the present invention to provide a device of the type mentioned at the beginning which enables flexible input reflection of target points, particularly under the boundary conditions named at the beginning and which, in particular, requires as few additional optical elements as possible.

This object is achieved according to the invention by a device for superimposing an image in the beam path of an aiming optic, having an at least partially transparent optical support element which is arranged in the beam path of the aiming optic and has at least one diffractive optical coupling element and at least one diffractive optical decoupling element, the at least one diffractive optical coupling element leading light of the image to be superimposed, which light is incident on said coupling element and is to be coupled in, through the optical support element to the at least one diffractive optical decoupling element for the purpose of superimposition with the beam path and the image to be superimposed being imaged into the beam path of the aiming optic by the at least one diffractive optical coupling element and the least one diffractive optical decoupling element.

These measures advantageously provide an input reflection concept for an aiming optic which ensures a high transmittance for the main light or observation light in the beam path of the aiming optic, while a flexible input reflection or superimposing of target points is enabled. The diffraction efficiency of the input reflection module can be greater than 1%. Furthermore, the use of a partially transparent optical support element having a diffractive optical coupling element and a diffractive optical decoupling element saves physical space, that is to say an adaptation to the physical space for telescopic sight and for aiming optics can be performed in a simple way. The inventive device likewise enables further or other instances of input reflection of information.

According to the invention, collimation and focusing of the beams are also undertaken in addition to beam deflection and superimposition. The optical coupling and decoupling elements hence additionally have an imaging function, and this renders it possible to manage without further conventional optical components between the object and intermediate image plane.

The diffractive optical coupling element can effect a beam deflection of the light to be coupled in to such an angle that total internal reflection of the light to be coupled in is achieved inside the optical support element.

It is advantageous when the diffractive optical coupling element effects a collimation of the light to be coupled in.

The diffractive optical decoupling element uses its diffracting deflecting function to effect an exit of the coupled-in light from the optical support element into the beam path of the aiming optic, and thereby undertake to superpose with the observation light on the observation beam path.

It is advantageous when the diffracting optical decoupling element effects focusing of the coupled-in light into the beam path of the aiming optic.

The diffractive optical coupling and decoupling elements can be produced holographically, mechanically or synthetically. They are preferably designed as holographic optical elements or holograms, that is to say elements produced holographically, and can be produced by superposing two spherical waves, or by superposing a spherical wave and a plane wave.

Furthermore, it can be provided according to the invention that an image reproduction unit facing the diffractive optical coupling element is provided which produces the light, which is to be coupled in, of the image to be superimposed and leads it onto the diffractive optical coupling element. LED, OLED displays, LCD or laser scanner modules can serve as imaging module or image reproduction unit.

The diffractive optical coupling element turned towards the image reproduction unit takes over the task of collimation and beam deflection to an angle which is required to reach total internal reflection inside the optical support element. By means of its diffracting deflection function, the diffractive optical decoupling element enables the exit of light from the support element, and simultaneously focuses the light into an intermediate image of the aiming optic.

The at least one diffractive optical coupling element can be designed as the reflection diffraction grating or a transmission diffraction grating. The at least one diffractive optical decoupling element can likewise be designed as a reflection diffraction grating or a transmission diffraction grating. Since an approximately equal fundamental frequency or number of lines on the two gratings can be selected, it is also possible to transmit a wider spectral region of light. The diffractive optical coupling element is preferably designed as a reflection diffraction grating, and the diffractive optical decoupling element as a transmission diffraction grating. Various embodiments are conceivable for guiding light in the support element. The advantage of the preferred variant consists, in particular in that, on the one hand, a reflection hologram provides the required diffraction efficiency for coupling light into the optical support element and, on the other hand, the decoupling hologram permits a spectral transmittance of greater than 95%. Furthermore, the diffractive optical coupling element and the diffractive optical decoupling element can be designed both as transmission diffraction gratings or as reflection diffraction gratings. In addition, it is possible to design the diffractive optical coupling element as a transmission deflection grating, and the diffractive optical decoupling element as a reflection diffraction grating.

The holographic input reflection has, moreover, the substantial advantage that a second, or even yet further diffractive optical coupling element(s) can be integrated in the optical support element in order for further data to be reflected in at another image field location, said coupling element also enabling images to be reflected in polychromically. It is also possible thereby to implement contents of input reflection in the case of which consideration can be given to specific stipulations relating to physical size. It is very advantageous when in the beam path of the aiming optics downstream of the eyepiece of the aiming optic in the propagation direction of the observation light the aperture or the diameter of the beam of the light to be coupled in is matched at least approximately to the aperture or the diameter of the axial beam of the observation light of the aiming optic.

It is very advantageous, furthermore, that in the beam path of the aiming optic the position of the exit pupil, or the pupil position, of the light to be coupled in corresponds at least approximately to the position of the exit pupil of the observation light of the aiming optic. In the case of a plurality of target points, respective individual positions also result for said target points their exit pupil. These should be adapted accordingly.

The target object and the target point reflected in can be observed simultaneously independently of the position of the eye inside the pupil on the eyepiece side owing to these adaptations of the light beam reflected in.

Consequently, the input reflection module consists of a combined holographic light guidance and imaging unit which implements a minimum transition for the main light of greater than 90%, and superposes the main light and the image location and the pupil of the imaging.

The optical support element is preferably designed as plane plate formed from glass. However, it can also be fabricated from plastic.

The image to be superimposed can have a target mark and/or arbitrary additional information or data.

A combination of a plurality of diffractive optical coupling elements with one decoupling element is conceivable for the purpose of combining the most varied imaging modules, and with polychromic image information, in particular.

A further respect of the invention relates to an aiming optic having an objective to be turned in the operating position to a target object to be observed, an eyepiece to be turned to an eye of the observer, a beam path and at least one inventive device for superimposing an image, at least a part of the at least one device according to the invention for superimposing the image or the optical support element thereof being arranged in the beam path of the aiming optic.

It is very advantageous when at least one part of the at least one device for superimposing an image, or the optical support element thereof is arranged in the beam path of the aiming optics on the objective side between the objective and an intermediate image plane next to the objective, or between the intermediate image plane next to the objective and a zoom optics which may be present.

It is thereby possible for a flexible target point to be reflected into the aiming optic, it being possible for the user to carry out an estimate of range via the coverage. The diffractive optical decoupling element lies between the intermediate image and objective or zoom, as a result of which the target point is magnified or demagnified by the zoom. Because the optical support element is not arranged directly in an intermediate image plane of the aiming optic, contaminants on the support surface are advantageously not visibly imaged, but act at the most as the minimum light loss.

Alternatively or in addition, it can be provided that at least one part of the at least one device for superimposing an image, or the optical support element thereof, is arranged in the beam path of the aiming optic on the eyepiece side and between the eyepiece and an intermediate image plane next to the eyepiece.

The aiming optic can be designed as a telescopic sight.

BRIEF DESCRIPTION OF THE DRAWINGS

Advantageous refinements and developments of the invention emerge from the subclaims. Exemplary embodiments of the invention are specified in principle below with the aid of the drawing, in which:

DETAILED DESCRIPTION OF THE INVENTION

The invention is explained below with the aid of a telescopic sight as an aiming optic. However, it can also be used for any other desired aiming optics.

Figure 1:
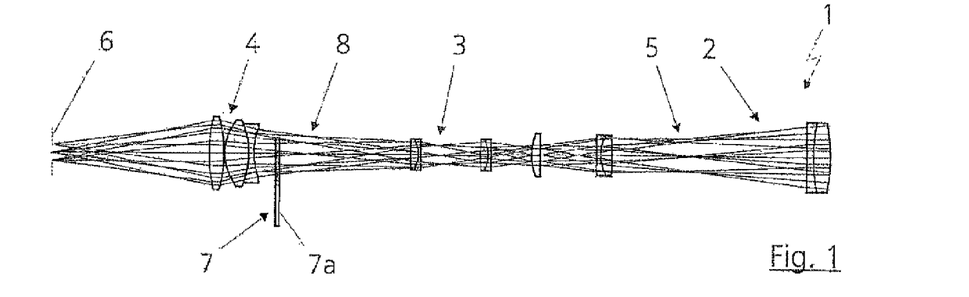
FIG. 1 shows a diagrammatic illustration of an aiming optic designed as a telescopic sight and having an inventive device for superimposing an image into the beam path thereof, in accordance with a first embodiment.

Illustrated diagrammatically in FIG. 1 in cutaway section is an aiming optic of variable magnification which is designed as a telescopic sight 1 and has an objective 2 at the light entry end, as well as a lens inversion system with a zoom optics 3 and an eyepiece 4. Also shown is a beam path 5 of the telescopic sight 1. An exit pupil 6 is indicated by dashes.

A telescopic sight 1 of variable magnification is sufficiently well known from the prior art, and so further details which are not essential to the invention will not be examined below.

A part of an inventive device 7 for superimposing an image and/or the optical support element 7a of said device are arranged in the beam path 5 of the telescopic sight 1 on the eyepiece side between the eyepiece 4 and an intermediate image plane 8 next to the eyepiece 4. As illustrated in a simplified way in FIGS. 2a and 2b, it is thereby possible for variable and/or flexible target points 9 of a target mark arrangement 10 to be superimposed into the beam path 5 of the telescopic sight 1 as an image 18.

Functionally identical elements are named below with the same reference symbols—provided with primes, if appropriate, in different embodiments.

Figure 3:
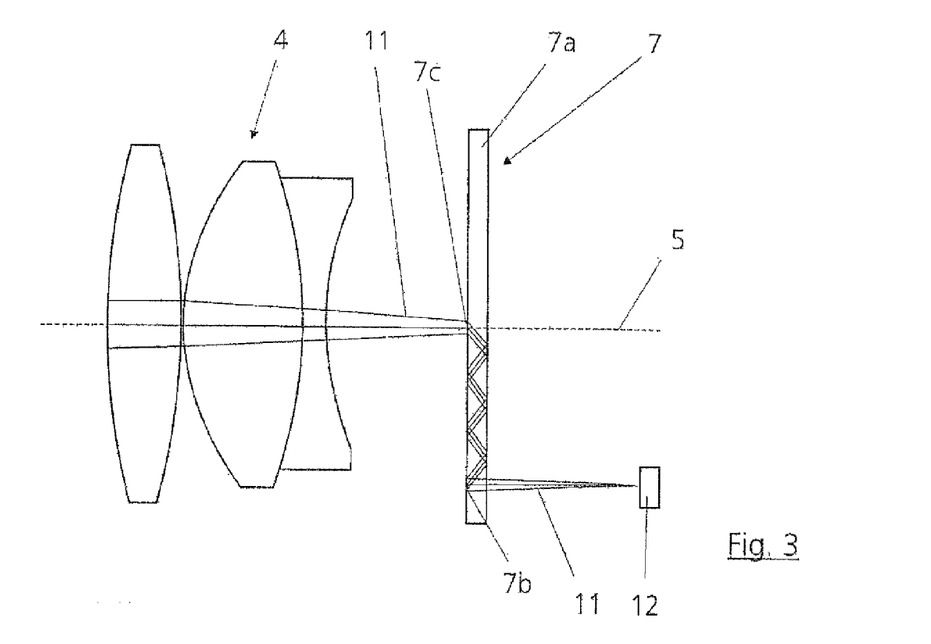
FIG. 3 shows a diagrammatic illustration of the inventive device in the first embodiment.

As may be seen from FIG. 3, the device 7 for superimposing an image 18 into the beam path 5 of the aiming optic 1 has a partially transparent optical support element 7a which has a diffractive optical coupling element 7b and a diffractive optical decoupling element 7c, the diffractive optical coupling element 7b leading light 11, which is to be coupled in and is incident on said coupling element, of the image 18 to be superimposed, through the optical support element 7a for the purpose of superimposition with the beam path 5 (indicated by dashed lines in FIG. 3) to the diffractive optical decoupling element 7c, and the image 18 to be superimposed is imaged into the beam path 5 of the aiming optic 1 through the diffractive optical coupling element 7b and the diffractive optical decoupling element 7c.

As may further be seen from FIG. 3, the diffractive optical coupling element 7b effects a beam deflection of the light 11, to be coupled in to such an angle or limiting angle $W_{Totalinternalreflexion}$, that total internal reflection of the light 11 to be coupled in is achieved inside the optical support element 7a. For the limiting angle $W_{Totalinternalreflexion}$ for the occurrence of total internal reflection, it holds that:

$$W_{Totalinternalreflexion} = \arcsin(1/n),$$

n being the refractive index of the material of the optical support element 7a.

In principle, the grating frequency of the diffractive optical coupling element 7b, 7b' should be selected in such a way that the light 11, 11' can be guided by total internal reflection in the support element 7a for all field angles and wavelengths.

The grating equation of the diffractive optical coupling element 7b, 7b' is as follows when consideration is given to diffraction in the medium:

$$\sin(\beta) = (k \times \lambda \times g - \sin(\alpha))/n,$$

in which it holds that:
k=diffraction order
(k=+1 in the present exemplary embodiment),
λ=wavelength in nm,
g=number of lines in 1/mm or grating frequency at the grating vertex,
α=incidence angle at the grating,
β=diffraction angle at the grating.

It must therefore hold for the diffractive optical coupling element 7, 7b' or the reflection diffracting grating that $$\sin(\beta) > W_{Totalinternalreflexion}$$

for all aperture angles and wavelengths which are used. In the present exemplary embodiment, the limiting angle for total internal reflection is $W_{Totalinternalreflexion} = 41.3°$, by way of example, while the diffraction angles β at the reflection diffraction grating lie between 52.2° and 54.1°. The associated mean numbers of lines are in this case 1841.9 lines/mm for a reflection diffraction grating, and 1,872.8 lines/mm for a transmission diffraction grating.

Furthermore, it may be seen from FIG. 3 that there is provided an image reproduction unit 12 which is turned towards the diffractive optical coupling element 7b, produces the light 11, which is to be coupled in, of the image 18 to be superimposed, and guides it onto the diffractive optical coupling element 7b.

The diffractive optical coupling element 7b effects collimation of the light 11 to be coupled in. Furthermore, by means of its diffracting deflecting function the diffractive optical decoupling element 7c effects an exit of the light 11 to be coupled in from the optical support element 7a in the beam path 5 of the aiming optic 1. In the present exemplary embodiment, the diffractive optical decoupling element 7c also effects focusing of the light 11, which is to be coupled in, into the beam path 5 of the aiming optics 1.

In the present exemplary embodiment, the diffractive optical coupling element 7b is designed as a reflection diffraction grating, while the diffractive optical decoupling element 7c is designed as a transmission diffraction grating. In further exemplary embodiments, the diffractive optical coupling element 7b and the diffractive optical decoupling element 7c could both be designed as reflection diffraction gratings or as transmission diffraction gratings. It is, moreover, conceivable to design the diffractive optical coupling element 7b as a transmission diffraction grating, and the diffractive optical decoupling element 7c as a reflection diffraction grating.

The exposure configuration of the diffractive optical decoupling element 7c is as follows in the first embodiment of the inventive device 7:

LC=∞ mm;
LD=15.5;
γ=0°;
δ=59.045°;
g=1872.8 lines/mm;
exposure wavelength 457.9 nm; and diffracting surface 3.5 mm×2.0 mm (value in dispersion direction).

The exposure configuration of the diffractive optical coupling element 7b is as follows in the first embodiment of the inventive device 7:

LC=∞ mm;
LD=24.31;
γ=0°;
δ=57.504°;
g=1841.94 lines/mm;
exposure wavelength 457.9 nm; and
diffracting surface 5.0 mm×2.0 mm (value in dispersion direction).

The variables LC, LD, γ, Δ denote the polar coordinates of the laser source point during exposure of the grating. LC and γ are the polar coordinates of the first laser source, and LD and Δ are the polar coordinates of the second laser source.

Figure 2A:
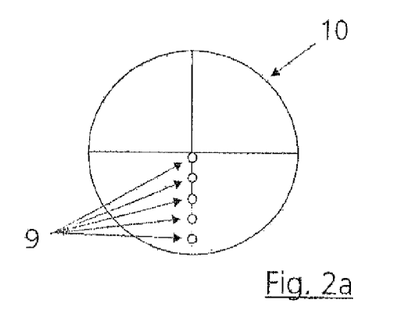
FIG. 2*a* shows a diagrammatic illustration of a target mark arrangement having a plurality of flexible target points.
Figure 2B:
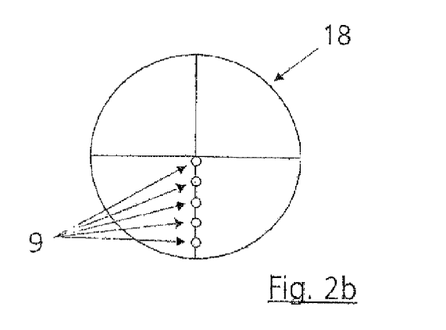
FIG. 2*b* shows a diagrammatic illustration of an image of the target mark arrangement of FIG. 2*a*.
Figure 4:
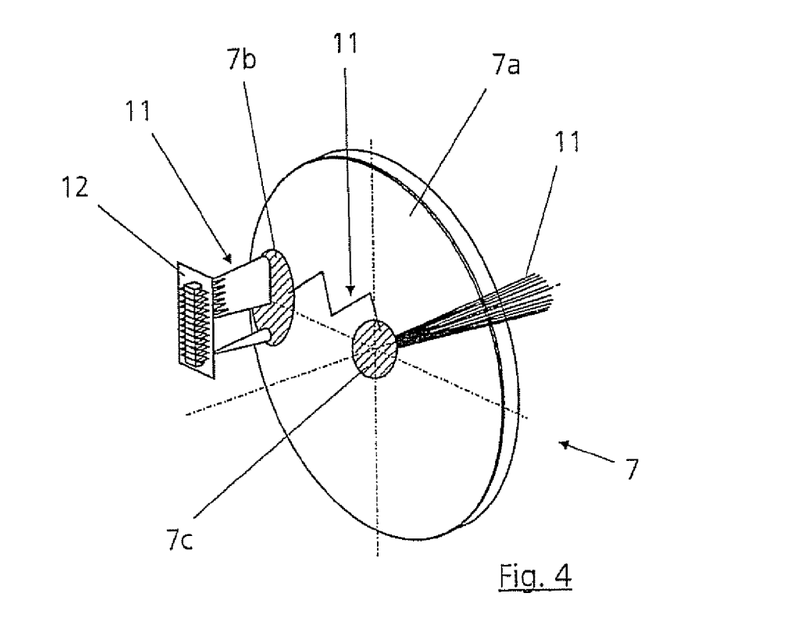
FIG. 4 shows a perspective view of the inventive device in the first embodiment.

The device 7 is illustrated in perspective in FIG. 4. The image reproduction unit 12 has a plurality of light-emitting diodes (LEDs). In this case, each light-emitting diode can produce a different target point 9 (compare FIG. 2). LED displays, OLED displays, LCD displays or laser scanner modules are suitable as image reproduction unit 12.

Figure 5:
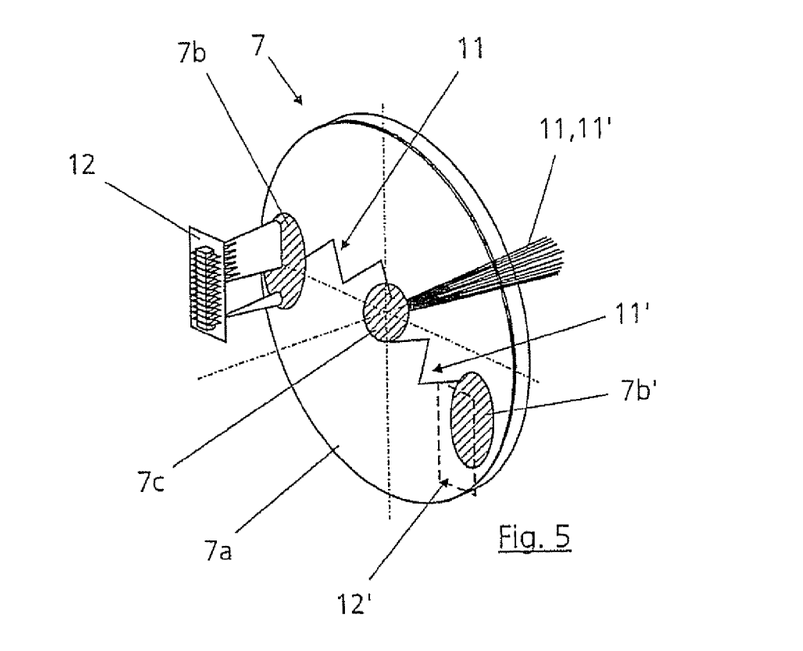
FIG. 5 shows a perspective view of the inventive device in a second embodiment.

FIG. 5 illustrates a second embodiment of the inventive device 7. In this case, a second diffractive optical coupling element 7b' is combined in a very advantageous way with the diffractive optical coupling element 7c, the result being, for example, to couple polychrome image information into the beam path 5 via coupled-in light 11' of the second image reproduction unit 12'. The image reproduction unit 12' can, for example, be designed as an LCD display or the like.

Figure 6:
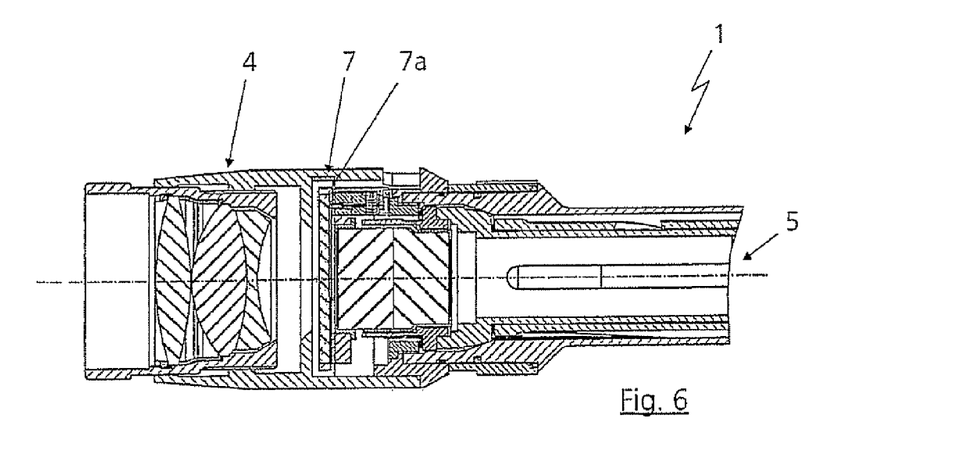
FIG. 6 shows a simplified sectional view of a part of the telescopic sight with the inventive device in the first embodiment.

The telescopic sight 1 with the device 7 for superimposing an image 18 in the beam path 5 is illustrated in FIG. 6 partially in a sectional view.

Figure 7:
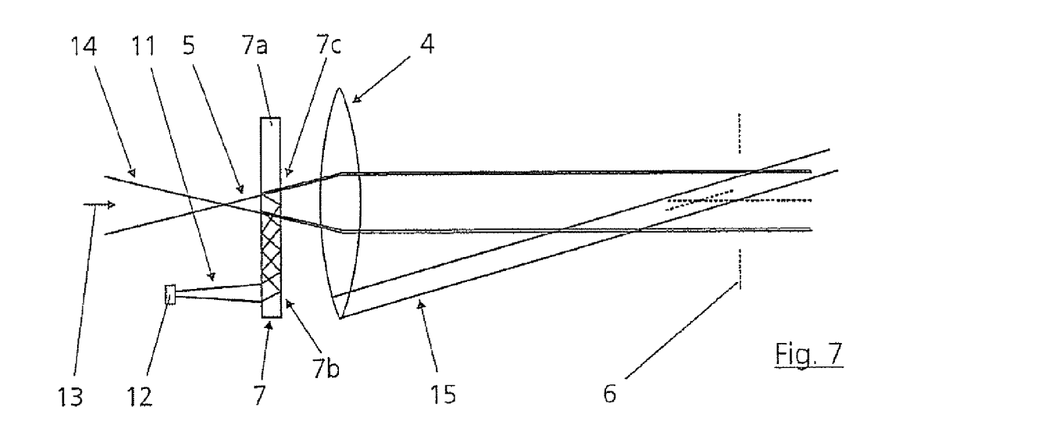
FIG. 7 shows a diagrammatic illustration of the matching of an aperture in the inventive device in accordance with the first embodiment.

As may be seen from FIG. 7, in the beam path 5 of the aiming optics 1 downstream of the eyepiece 4 of the aiming optics 1 in the propagation direction of the observation light (indicated by the arrow 13) the aperture or the diameter of the beam of the light 11 to be coupled in is matched at least approximately to the aperture or the diameter of the axial beam 14 of the observation light of the aiming optic 1. The axial beam 14 in this case comprises beams emanating from the mid point of the field of view up to the pupil entry, or beams which, as it were, fill up the pupil entirely. A marginal beam is indicated diagrammatically by the reference symbol 15. The beam path of the coupled-in light 11 is sketched only in greater simplified fashion in the optical support element 7a in FIG. 7.

Figure 8:
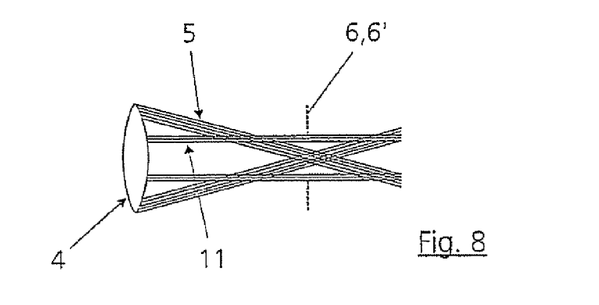
FIG. 8 shows a schematic illustration of a pupil matching of the inventive device in accordance with the first embodiment.

As may be seen from FIG. 8, in the beam path 5 of the aiming optic 1 the position of the exit pupil 6' of the coupled-in light 11 corresponds at least approximately to the position of the exit pupil 6 of the observation light of the aiming optic 1.

Figure 9:
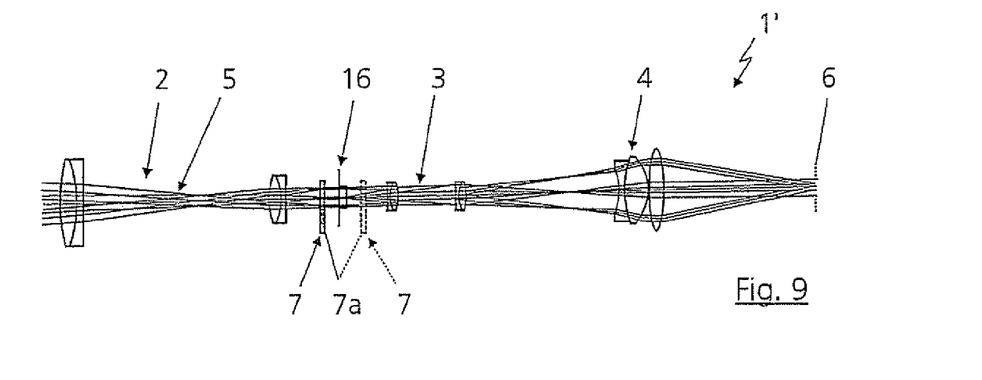
FIG. 9 shows a diagrammatic illustration of an aiming optics designed as a telescopic sight and having an inventive device for superimposing an image in a third embodiment.

A further embodiment of a telescopic sight 1' is illustrated in FIG. 9. A part of a device 7 in a third embodiment for superimposing an image 18 or the optical support element 7a thereof is arranged on the objective side or between the objective 2 and an intermediate image plane 16 next to the objective 2. In a further exemplary embodiment, the device 7 could also be arranged between the intermediate image plane 16 next to the objective 2 and the zoom optics 3 (indicated by dashes). The object-side arrangement of the device 7 has the advantage that the target points 9 change in size with the magnification set via the zoom optics 3, and thus the coverage remains the same, as a result of which the observer can estimate range.

Figure 10:
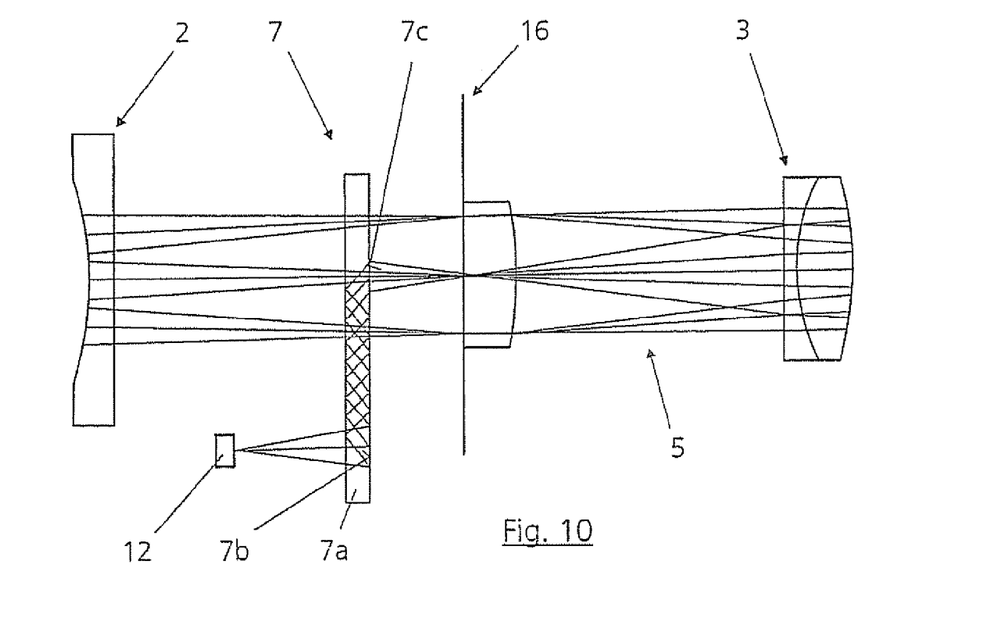
FIG. 10 shows a diagrammatic illustration of the inventive device in the third embodiment.

FIG. 10 shows the arrangement of the device 7 in the telescopic sight 1' more precisely.

In the case of the third embodiment of the inventive device 7, the exposure configuration of the diffractive optical decoupling element 7c is designed as follows (as a holographic sine profile):

γ=0°;
Δ=53.9°;
LC=10.7 mm;
LD=269.0 mm;
α=48.7°;
Transmission deflection of BK7 in air; and
g=1765 lines/mm.

Similarly, the exposure configuration for the diffractive optical coupling element 7b in the third embodiment runs as follows:

γ=−2.7°;
Δ=58.8°;
LC=15.1 mm;
LD=280.0 mm;
α=0°; and
g=1765 lines/mm.

Figure 11:
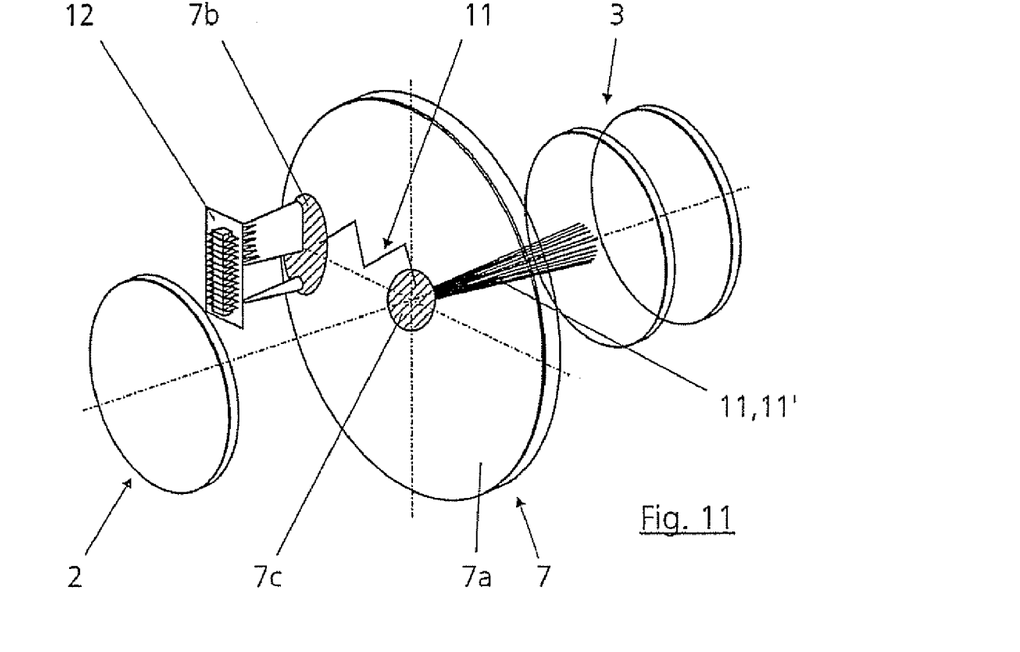
FIG. 11 shows a perspective view of the inventive device in the third embodiment.

FIG. 11 shows a perspective view of the device 7 in the telescopic sight 1'.

Figure 12:
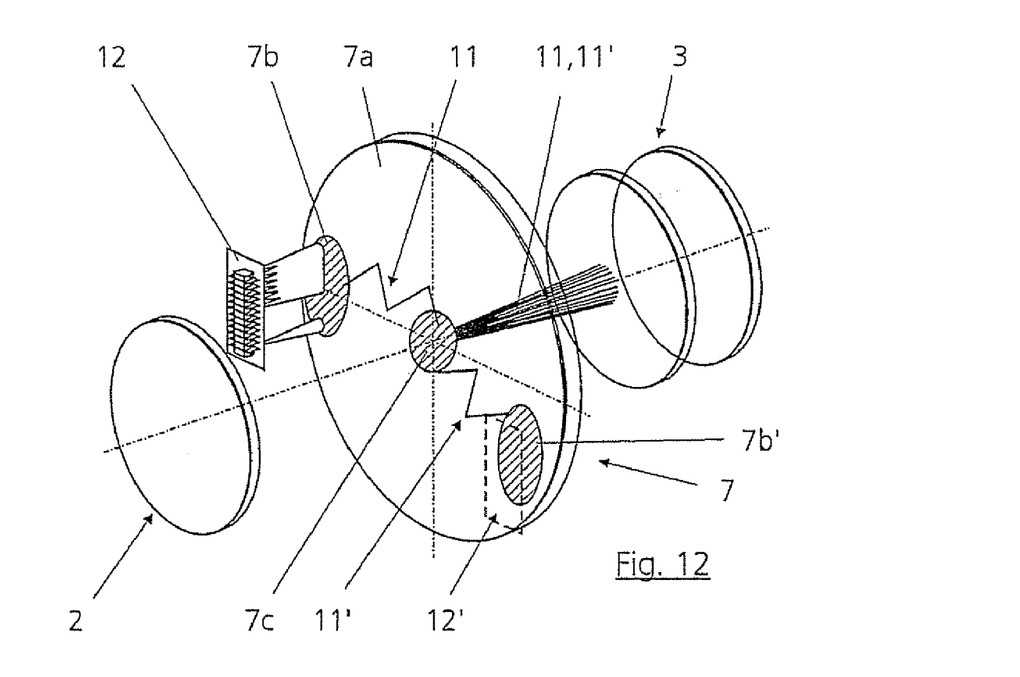
FIG. 12 shows a perspective view of an inventive device for superimposing an image in a fourth embodiment.

In a fashion similar to FIG. 5, FIG. 12 shows a perspective view of a fourth embodiment of the support element 7a with a further coupling element 7b', a further reproduction unit 12', and thus an additional light 11' to be coupled in.

The diffractive optical coupling elements 7b, 7b' and the diffractive optical decoupling element 7c are designed as holographic, that is to say holographically produced, optical elements or holograms.

The optical support element 7a is a plane plate formed from glass. It could also be fabricated from plastic in further exemplary embodiments.

The image 18 to be superimposed can also have additional information or data as an alternative or in addition to the target points 9.

While the invention has been described with reference to various preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A device for superimposing an image onto an image of an observed object observed through an aiming optic of the type having a beam path along which is carried observation light representing the image of the observed object, said device comprising:

an at least partially transparent optical support element, said optical support element having at least one diffractive optical decoupling element located in the beam path, said optical support element also having at least one diffractive optical coupling element located outside the beam path, said optical coupling element receiving incident light of the image to be superimposed onto the image of the observed object and coupling said light of the image to be superimposed into said optical support element, said optical support element internally guiding said light of the image to be superimposed to said optical decoupling element, said light of the image to be superimposed exiting from said optical support element and being imaged into said beam path by way of said optical decoupling element.

2. A device according to claim 1, wherein said diffractive optical coupling element effects a beam deflection of the light of the image to be superimposed to such an angle that total internal reflection of the light of the image to be superimposed is achieved inside the optical support element.

3. A device according to claim 1, wherein said diffractive optical coupling element effects a collimation of the light of the image to be superimposed.

4. A device according to claim 1, wherein said diffractive optical decoupling element uses a diffracting deflecting function to effect an exit of the light of the image to be superimposed from the optical support element into the beam path.

5. A device according to claim 1, wherein said diffractive optical decoupling element effects focusing of the light of the image to superimposed into the beam path.

6. A device according to claim 1, wherein said at least one diffractive optical coupling element comprises a reflection diffraction grating or a transmission diffraction grating.

7. A device according to claim 1, wherein said at least one diffractive optical decoupling element comprises a reflection diffraction grating or a transmission diffraction grating.

8. A device according to claim 1, further comprising an image reproduction unit for generating the light of the image to be superimposed and directing it onto said diffractive optical coupling element.

9. A device according to claim 1, wherein said optical support element comprises a plane plate formed of glass.

10. A device according to claim 1, wherein the image to be superimposed comprises a target mark and/or additional information or data.

11. A device according to claim 1, wherein said at least one diffractive optical coupling element comprises a holographic optical element.

12. A device according to claim 1, wherein at said diffractive optical decoupling element comprises a holographic optical element.

13. An aiming optic of the type having an objective to be turned in an operating position toward an observed object, an eyepiece to be turned in the operating position toward an eye of the observer, and a beam path which carries observation light representing the image of the observed object observed by the observer through the aiming optic using the eye, said aiming optic comprising:

at least one device for superimposing at least one image onto an image of the observed object, said device including an at least partially transparent optical support element, said optical support element having at least one diffractive optical decoupling element located in the beam path, said optical support element further having at least one diffractive optical coupling element located outside the beam path, said optical coupling element receiving incident light of the image to be superimposed onto the image of the object being observed and coupling said light into said optical support element, said optical support element internally guiding said light of the image to be superimposed to said optical decoupling element, said light of the image to be superimposed exiting from said optical support element and being imaged into the beam path by way of said optical decoupling element.

14. An aiming optic according to claim 13, wherein the observation light includes an axial beam which travels in a propagation direction and wherein, downstream of the eyepiece in the propagation direction, the axial beam of observation light has a diameter and the diameter of a beam of the light of the image to be superimposed at least approximately matches said diameter of the axial beam of the observation light.

15. An aiming optic according to claim 13, wherein in the beam path, the position of an exit pupil of the of the image to be superimposed has an axial position which at least approximately corresponds to a position of an exit pupil of the observation light of the aiming optic.

16. An aiming optic according to claim 13, wherein at least a part of said device is arranged in the beam path between the objective and an intermediate image plane, said intermediate image plane being located next to the objective.

17. An aiming optic according to claim 13, wherein the at least a part of said device, is arranged in the beam path of the aiming optic between the eyepiece and an intermediate image plane of the aiming optic, said intermediate image plane being located next to the eyepiece.

18. An aiming optic according to claim 13, wherein said aiming optic comprises a telescopic sight.

19. An aiming optic according to claim 13 wherein said aiming optic further comprises zoom optics located in the beam path and wherein at least said optical decoupling element lies between an intermediate image plane of the aiming optic and said zoom optics, said intermediate image plane being located next to the objective.

* * * * *

UNITED STATES PATENT AND TRADEMARK OFFICE
CERTIFICATE OF CORRECTION

PATENT NO. : 8,405,904 B2  Page 1 of 1
APPLICATION NO. : 12/629117
DATED : March 26, 2013
INVENTOR(S) : Dobschal et al.

It is certified that error appears in the above-identified patent and that said Letters Patent is hereby corrected as shown below:

On the Title Page item (75)
delete "Eva-Maria Menzel, Jena" and insert --Eva-Maria Menzel, Jena (DE)--

In the Specifications

Column 6, line 27
delete "$W_{Totalinternalreflexlon}$" and insert --$W_{Totalinternalreflexion}$--

In the Claims

Column 10, line 26
delete "exit pupil of the of the image" and insert --exit pupil of the image--

Signed and Sealed this
Sixth Day of May, 2014

Michelle K. Lee
*Deputy Director of the United States Patent and Trademark Office*